Patented Apr. 4, 1944

2,346,027

UNITED STATES PATENT OFFICE 2,346,027

PROCESS FOR THE MANUFACTURE OF ARYL-ALICYCLIC FATTY ACID ESTERS

Karl Hoffmann and Leandro Panizzon, Basel, Switzerland, assignors, by mesne assignments, to Ciba Pharmaceutical Products, Incorporated, Summit, N. J., a corporation of New Jersey No Drawing. Application October 4, 1940, Serial No. 359,804. In Switzerland October 25, 1939

8 Claims. (Cl. 260—468)

The preparation of aryl-alicyclic fatty acids, for example, of phenyl-cyclohexylacetic acid is already known. Thus, for instance, benzyl cyanide may be caused to react with cyclohexyl bromide in the presence of sodium amide, the resultant phenylcyclohexylacetonitrile being saponified. The yields, though, are unsatisfactory. Experiments have proved that the reduction of diphenylacetic acid or of its esters in the presence of noble metal catalysts leads for the most part to dicyclohexylacetic acid or its esters. In the catalytic reduction of diphenylacetic acid or of benzilic acid in the presence of base metal catalysts such as nickel, an extensive splitting and decomposition takes place.

The surprising observation has now been made that it is possible to obtain aryl-alicyclic fatty acids or their esters in good yield if polyaryl fatty acid esters, for example, diphenylacetic acid ester, diphenylglycollic acid ester, their alkyl or acyl derivatives, are reduced with hydrogen in the presence of base metal catalysts and, if desired, hydrolyzing agents are allowed to react upon the esters obtained.

Base metal catalysts which may be used, if desired on carriers, are, for example, nickel, cobalt or mixtures of these metals. The reaction is effected preferably at a raised temperature, for example at 120–140° C. But depending on whether a more active or less active catalyst is used, the reaction temperature chosen must be less high or then higher.

The products thus obtained may serve as intermediate products for example, in the manufacture of medicaments.

Example 1

232 parts of diphenylacetic acid methyl ester are dissolved in 700 parts of ethyl alcohol and are heated in a high pressure autoclave under hydrogen pressure to 120–140° C. together with 50 parts of a prereduced nickel catalyst on kieselguhr (Reactions of Hydrogen by Homer Adkins, Wisconsin Press, page 14, line 22 et seq.). The quantity of hydrogen required for the hydrogenation of one nucleus is taken up. When the reduction is complete, the reaction mixture is allowed to cool, after which it is filtered free from the catalyst and the solvent is removed by distillation. The phenylcyclohexylacetic acid methyl ester thus obtained is an oil. By boiling it with aqueous or alcoholic caustic alkali solutions it may be saponified, phenylcyclohexylacetic acid being obtained, melting point 148–149° C.

In place of the methyl ester, higher esters, such as the ethyl ester, may be used. Other inert solvents are also suitable for use as solvent.

The reduction may be carried out equally satisfactorily in an ordinary autoclave at about 20–30 atmospheres' pressure.

Example 2

200 parts of diphenylglycollic acid methyl ester and 50 parts of a prereduced nickel catalyst are shaken in the presence of about 200 parts of absolute alcohol in an autoclave at 120–130° C. under pressure of hydrogen. The quantity of hydrogen equivalent to 4 mols is taken up. When the reduction is complete, the reaction product is worked up as described in Example 1. Almost quantitative yield of pure phenylcyclohexyl acetic acid is obtained.

When using diphenylglycollic acid esters having an etherified or esterified hydroxyl group as starting materials, phenylcyclohexylacetic acid esters or the free acid thereof is also obtained, while splitting off the ether group or ester group.

What we claim is:

1. A process of the character described, which comprises heating a poly-(α-phenyl)-substituted acid ester of the group consisting of poly-(α-phenyl)-substituted acetic acid esters and poly-(α-phenyl)-substituted glycollic acid esters with hydrogen under pressure in the presence of a base metal catalyst selected from the group consisting of nickel, cobalt and mixtures of these metals, and separating the resultant partially-reduced product after absorption of a quantity of hydrogen sufficient for the reduction of at least one of the phenyl nuclei of the said poly-(α-phenyl)-substituted acid ester but less than required for the reduction of all the phenyl nuclei of the latter has taken place.

2. A process of the character described, which comprises heating an ester of the formula

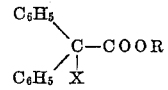

wherein R represents lower alkyl and X represents a member of the group consisting of hydrogen and hydroxyl, with hydrogen under pressure in the presence of a base metal catalyst selected from the group consisting of nickel, cobalt and mixtures of these metals, and separating the resultant partially-reduced product after absorption of a quantity of hydrogen sufficient for the reduction of at least one of the above-indicated $C_6H_5$-groups but less than required for the reduction of both $C_6H_5$-groups has taken place.

3. A process of the character described, which comprises heating an α:α-diphenyl acetic acid ester with hydrogen under pressure in the presence of a base metal catalyst selected from the group consisting of nickel, cobalt and mixtures of these metals, and separating the resultant α:α-phenyl-cyclohexyl-acetic acid ester after the absorption of only 3 mols of hydrogen has taken place.

4. A process of the character described, which comprises heating an α:α-diphenyl glycollic acid ester with hydrogen under pressure in the presence of a base metal catalyst selected from the group consisting of nickel, cobalt and mixtures of these metals, and separating the resultant product after the absorption of only 4 mols of hydrogen has taken place.

5. A process of the character described, which comprises heating an α:α-diphenyl glycollic acid ester with hydrogen under pressure in the presence of nickel catalyst to about 120–140° C., and separating the resultant product after the absorption of only 4 mols of hydrogen has taken place.

6. A process of the character described, which comprises heating an α:α-diphenyl glycollic acid ester with hydrogen under pressure in the presence of nickel catalyst to about 120–140° C., and separating the resultant product after the absorption of only 4 mols of hydrogen has taken place, and reacting the resultant ester with a hydrolyzing agent.

7. A process for the manufacture of an α:α-phenyl-cyclohexyl-acetic acid ester, which comprises heating an α:α-diphenyl acetic acid ester with hydrogen under pressure in the presence of nickel catalyst to about 120–140° C., and separating the resultant α:α-phenyl-cyclohexyl-acetic acid ester after the absorption of only 3 mols of hydrogen has taken place.

8. A process for the manufacture of an α:α-phenyl-cyclohexyl-acetic acid ester, which comprises heating an α:α-diphenyl acetic acid ester with hydrogen under pressure in the presence of nickel catalyst to about 120–140° C., and separating the resultant α:α-phenyl-cyclohexyl-acetic acid ester after the absorption of only 3 mols of hydrogen has taken place, and reacting the resultant ester with a hydrolyzing agent.

KARL HOFFMANN.
LEANDRO PANIZZON.